Jan. 8, 1935.  E. T. AVERY  1,986,914

HEATING INSTALLATION FOR DOMESTIC UTILIZATION

Filed April 13, 1933  8 Sheets-Sheet 1

INVENTOR
EDGAR T. AVERY
BY Oscar A. Geier
ATTORNEY

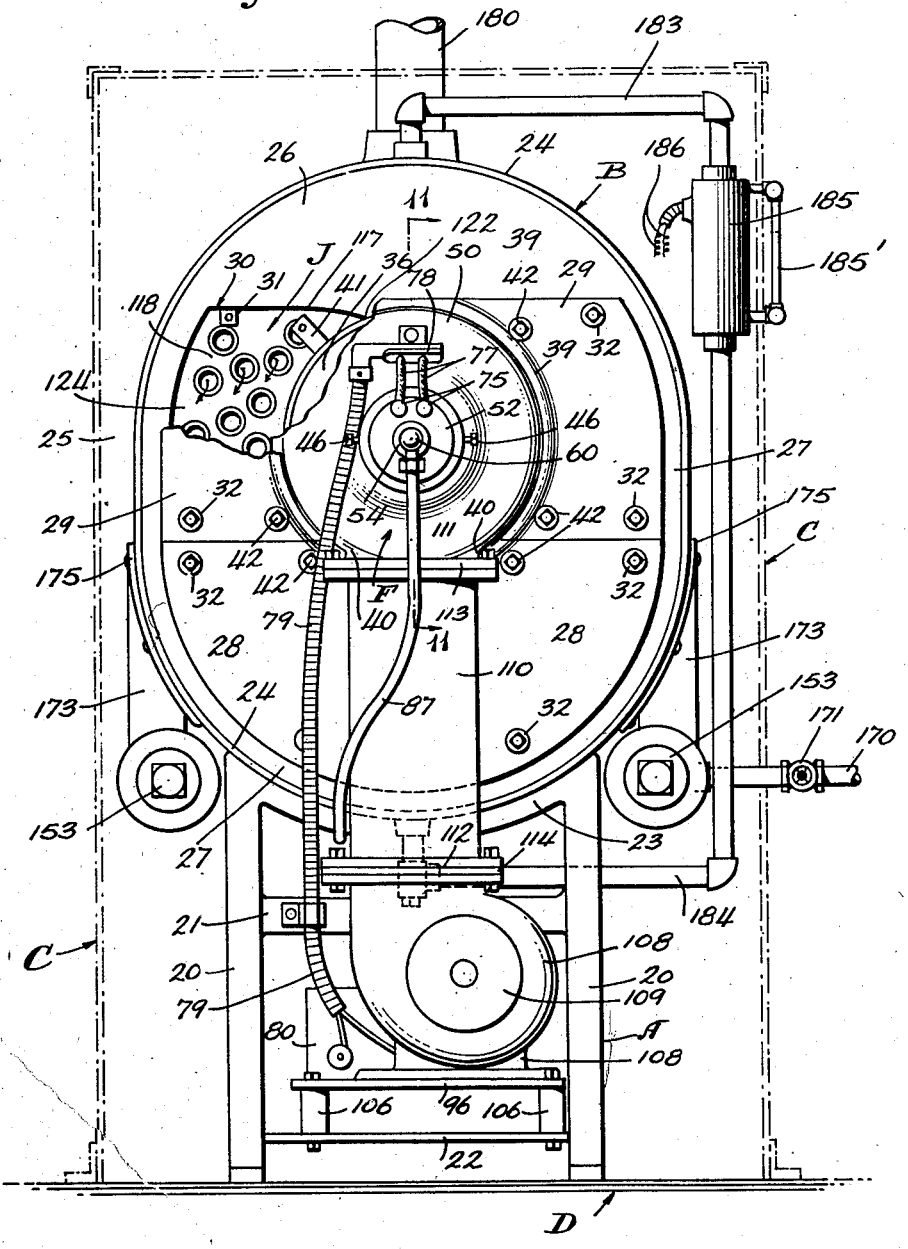

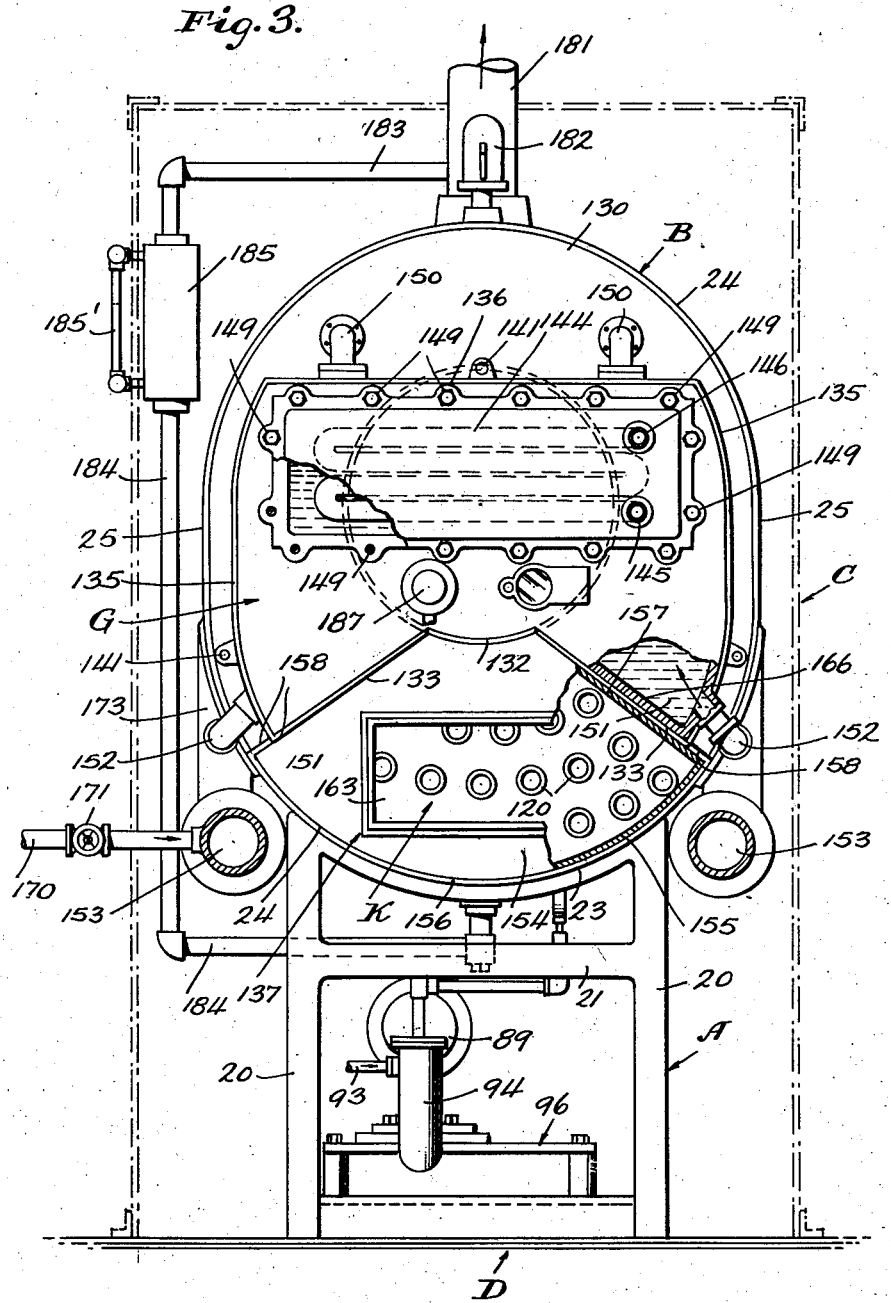

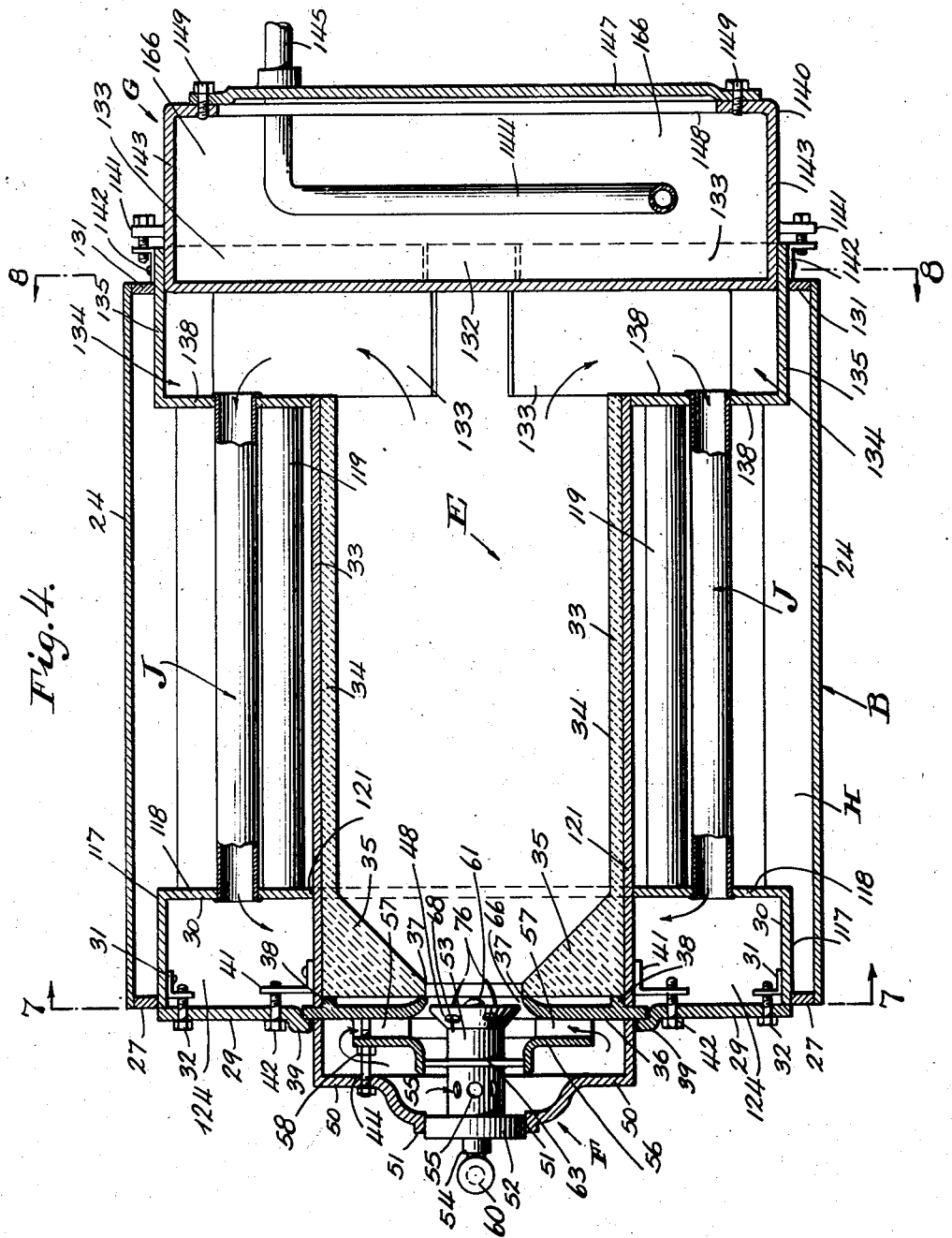

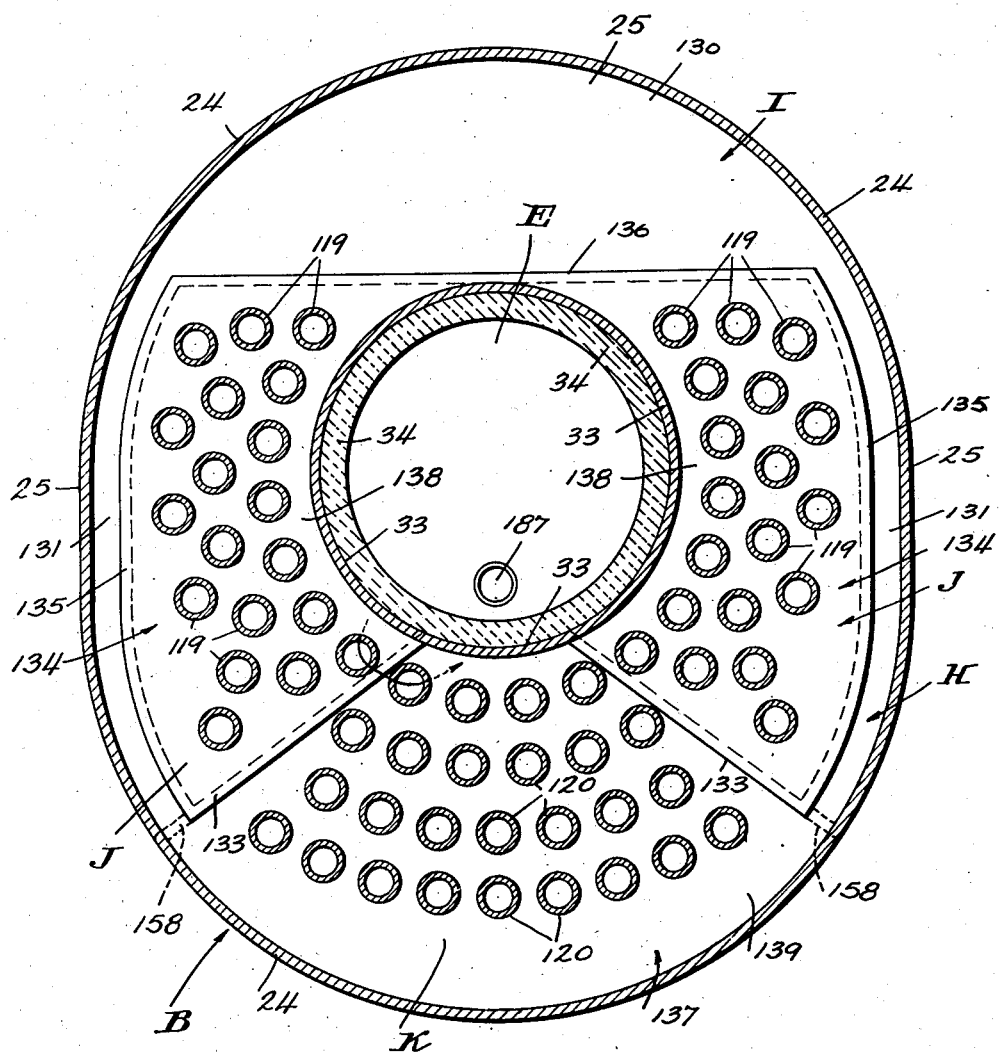

Jan. 8, 1935. E. T. AVERY 1,986,914
HEATING INSTALLATION FOR DOMESTIC UTILIZATION
Filed April 13, 1933 8 Sheets-Sheet 6
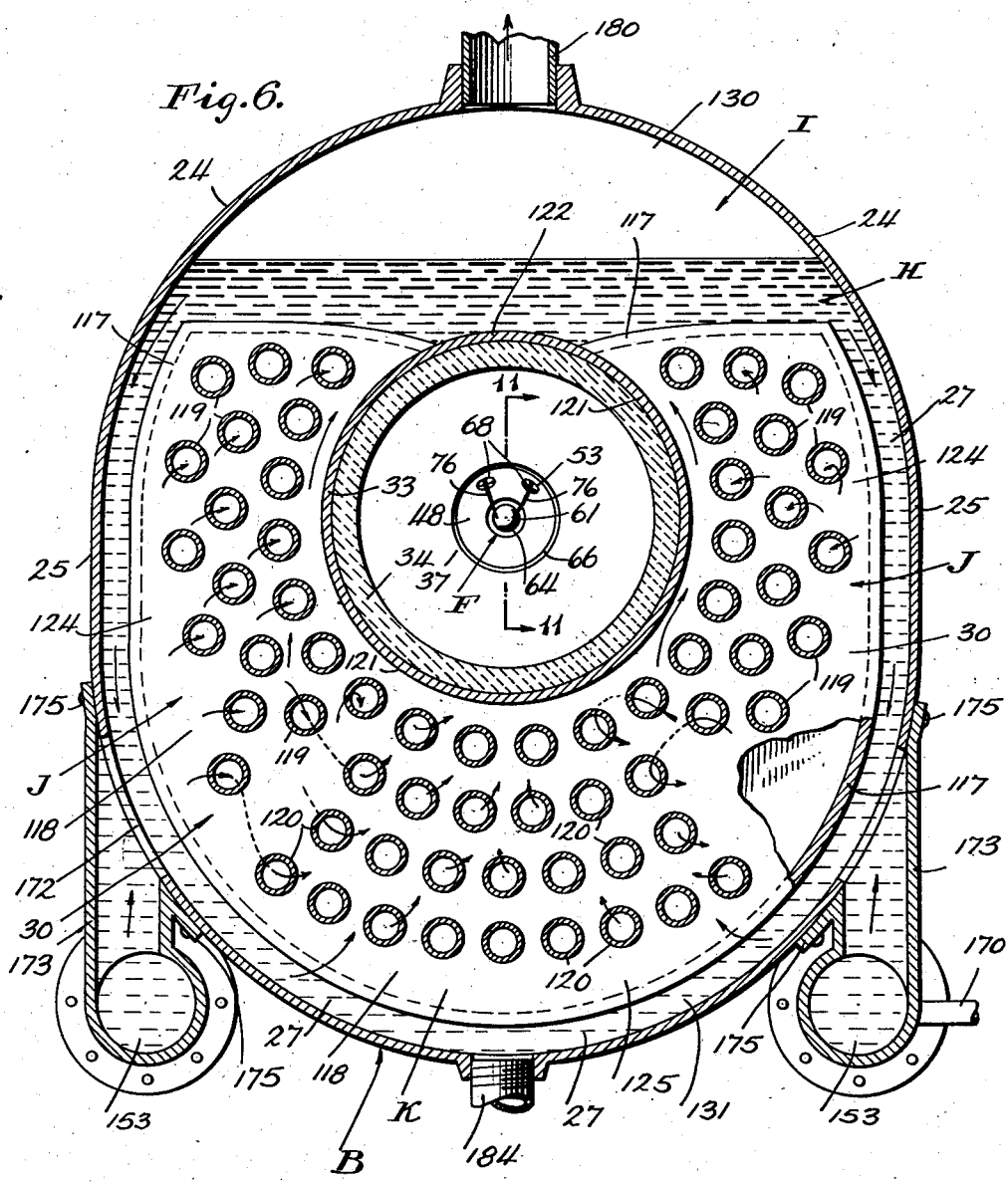
INVENTOR
EDGAR T. AVERY
BY Oscar A. Geier
ATTORNEY

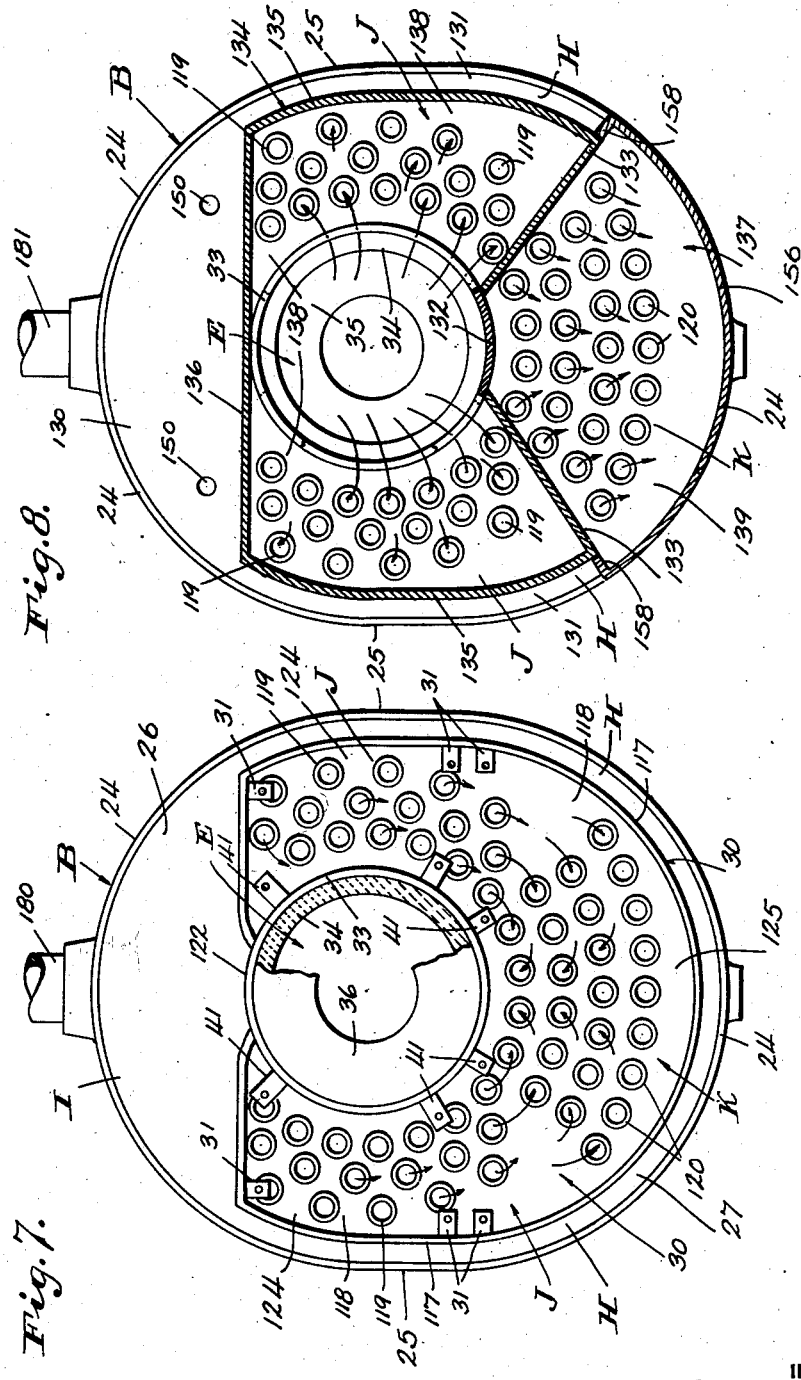

Jan. 8, 1935.  E. T. AVERY  1,986,914

HEATING INSTALLATION FOR DOMESTIC UTILIZATION

Filed April 13, 1933  8 Sheets-Sheet 8

INVENTOR
EDGAR T. AVERY
BY
Oscar A. Geier
ATTORNEY

Patented Jan. 8, 1935

1,986,914

UNITED STATES PATENT OFFICE 1,986,914

HEATING INSTALLATION FOR DOMESTIC UTILIZATION

Edgar T. Avery, Maplewood, N. J.

Application April 13, 1933, Serial No. 665,881

3 Claims. (Cl. 122—149)

This invention relates to a heating system and it particularly relates to automatic heating arrangements for domestic utilization utilizing a liquid fuel and supplying hot water for washing purposes and steam, and/or hot water for heating purposes.

An object of the present invention is to provide an inexpensive, compact and relatively light weight heating arrangement for domestic utilization which will be substantially automatically controlled and which will at all times supply adequate quantities of hot water and/or steam for heating purposes and hot water for washing and similar purposes.

Another object is to provide a compact, inexpensive and light weight boiler installation for domestic utilization in which all the auxiliary apparatus will be unitarily combined with the boiler structure itself, and in which the heat generated by the combustion of the liquid fuel will be most effectively utilized.

Another object is to provide a compact, inexpensive and light weight utilization in which an oil burner and accompanying oil and air supply may be compactly combined with the boiler proper and associated with automatic controls, which will not substantially increase the cost of installation and will not be subject to ready disadjustment.

Other objects will appear during the course of the following specification.

The above and other objects will appear more clearly from the following detailed description, when taken in connection with the accompanying drawings, which illustrate one embodiment of the inventive idea.

In the drawings:

Fig. 2 is a front view with a portion of the cover plate removed, taken in the direction as indicated by the arrows 2 in Fig. 1.

Fig. 3 is a rear view in fragmentary section, taken in the direction as indicated by the arrows 3 on Fig. 1.

Fig. 4 is a top transverse sectional view upon an enlarged scale, taken upon the line 4—4 of Fig. 1, showing the combustion chamber construction.

Fig. 5 is a side sectional view upon an enlarged scale upon the line 5—5 of Fig. 1.

Fig. 6 is a sectional view upon an enlarged scale on the line 6—6 of Fig. 1.

Fig. 7 is a front view of the front of the interior boiler upon the same scale as Fig. 1, on the line 7—7 in Fig. 1 with the auxiliary equipment and cover plates removed.

Fig. 8 is a rear view taken on the line 8—8 upon the same scale as Fig. 1 with the auxiliary equipment removed to show the interior construction.

Figure 1:
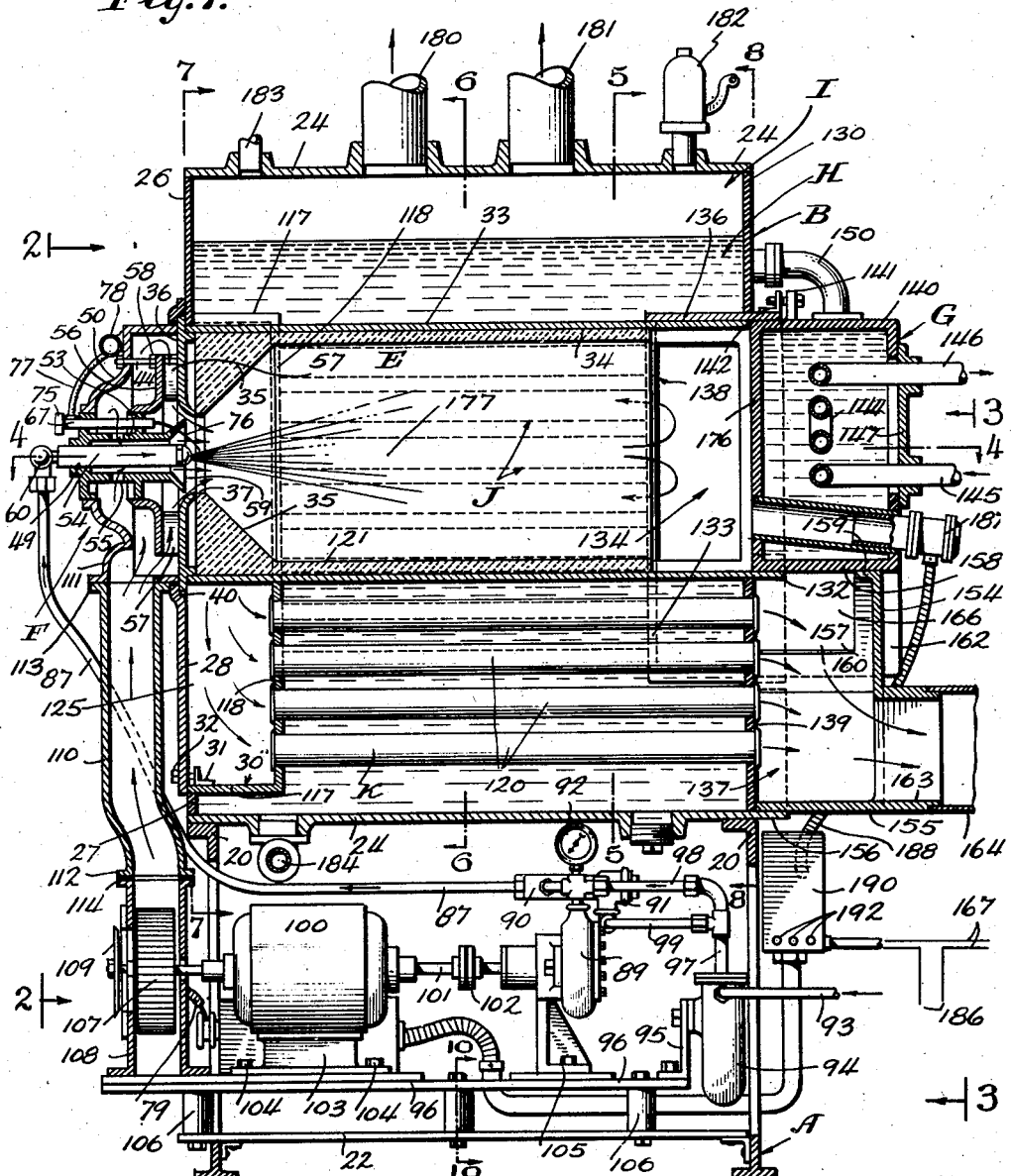
Fig. 1 is a side sectional view of the entire installation.
Figure 11:
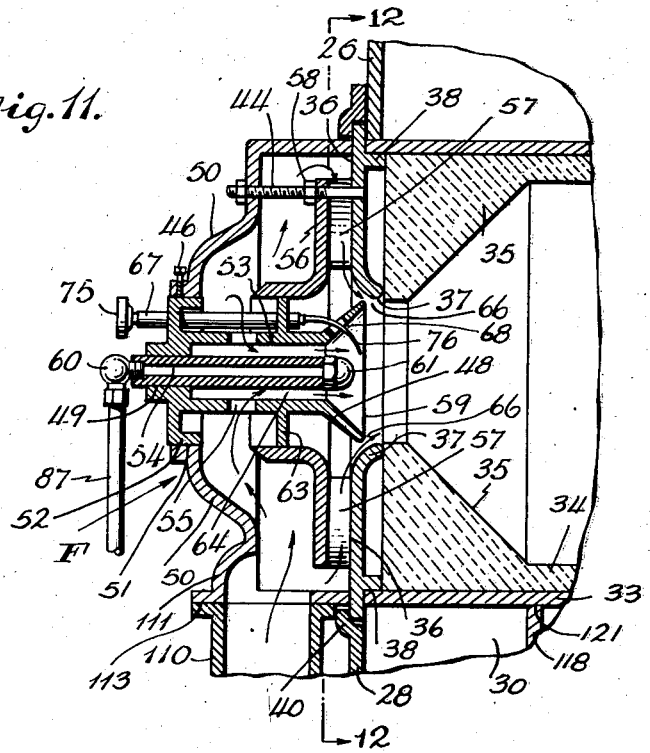
Figure 12:
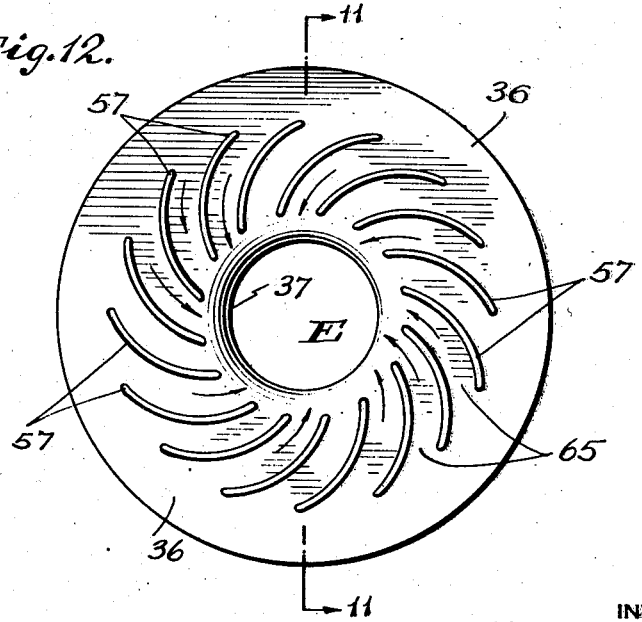

Fig. 11 is an enlarged fragmentary side sectional view of the burner construction similar to that shown in Fig. 1 on the lines 11—11 of Figs. 2 and 6, and Fig. 12 is a top sectional view upon the line 12—12 of Fig. 11.

In the drawings the support A carries the boiler B which is enclosed in a casing or enclosure C and supported upon the base floor or ground D. The boiler B is provided with a combustion chamber E with an oil burner construction F and with water leg G for heating the domestic water supply.

The boiler is of the fire tube type and is provided with a water space H, a steam space I, two groups of forward-pass fire tubes J and one group of rear-pass fire tubes K.

The support A which supports the boiler B upon the floor D is preferably formed by the front and rear frame members 20 (see Figs. 1, 2 and 3) having cross braces 21, the longitudinal bracing platform 22, which latter serves to support the various auxiliary apparatus for supplying the air and fuel oil to the oil burner F.

The upper portion of the frames 20 is concaved as indicated at 23 in Figs. 2 and 3 to receive the boiler B.

The boiler B (see Figs. 1 to 8) is provided with an exterior shell 24 which is of oval shape, with flattened side portions 25. The boiler shell 24 has the front cover plate 26 and the rear cover plate 130.

The front cover plate 26 has a relatively large opening therein so that only a thin marginal border portion 27 will extend around the lower and bottom edges of the boiler shell 24 (see Figs. 1, 2, 4 and 6). The opening in the front cover plate 26 is covered by the plates 28 and 29, as shown best in Figs. 2 and 4.

Fitting in the opening in the front cover plate 26 is the front flue chamber structure 30 which is connected to said plates 28 and 29 by the angle members 31 and the bolts 32, as indicated in Figs. 1, 2 and 4.

The cover plates 28 and 29 are provided with a central cylindrical opening which receives the end of the fire chamber E, said fire chamber consisting of a cylindrical sheet metal member 33 which is provided with suitable fire brick or other refractory lining 34, said lining having a conical portion 35 of substantially increased thickness adjacent the burner F.

The front end of the combustion chamber shell 33 is covered by the plate 36 (see Figs. 1, 2, 4, 7, 11 and 12). The plate 36 is provided with a central inwardly lipped opening 37 which provides for the burner inlet and is also provided with a flange or angle 38 which fits inside of the end of the fire box shell 33.

The lip 37 closely contacts with the edge of the opening 43 of the fire brick lining 35. The edge of the cover 36 is covered by the lips 39 on the plates 29 and the lip 40 on the plate 28. The angle members 41 attached to the shell 33 of the combustion chamber, together with the bolts 42, clamp the lips 39 and 40 to the edges of the cover 36.

The burner construction F is connected to the plate 36 (see Figs. 1, 4, 11 and 12). The burner construction F includes a main dished casing 50 which is connected to the plate 36 by the bolts 44 which extend transversely across the burner construction and are arranged symmetrically around the entire burner construction.

The bottom of the dished casing 50 is provided with a central opening 51 into which the enlarged cylindrical flanged section 52 of the burner 53 extends. The cylindrical section 52 of the central burner member 53 is held in position and adjustment is permitted by the setscrew 46. The central cylindrical burner section 53 has a conically diverging end portion 48 which extends toward and terminates closely adjacent to the lip 37 of the cover plate 36.

The base 52 of the burner cylinder 53 is provided with a central opening 49, which receives the cylindrical annular nozzle member 54.

To the inlet end of the annular cylindrical nozzle 54 is connected the inlet angle 60 (see Figs. 11 and 12) while at the outlet end is connected the spray nozzle 61 (see also Figs. 4 and 6). The cylindrical burner section 53 is provided with the air inlet ports 55.

The cover plate 36 (see Figs. 11 and 12) carries the curved fins 57, which may be cast integrally therewith. The circular angle plate 56 is clamped on top of these fins 57 by the bolts 44 and the nuts 58 to cover the passages between the fins. The plate 56 is centered by the outwardly projecting lip 63 extending peripherally away from the tubular section 53.

In the burner construction F, it is thus evident that there will be a central inner annular stream of air which will be admitted through the inlet ports 55 and will stream along through the annular passage 64 and outwardly into the space inside of the conical extension 48, while there will be an additional outer annular supply of air which upon passing through the parallel spiral passages 65 will then pass through the adjustable annular space 66 between the end of the conical section 48 and the lip 37 with a whirling motion.

The ignition members 75 (see Figs. 1, 2, 4 and 11) are provided with shanks 67 which extend through the cylindrical centering section 52 of the burner section 53 and through the flange or fin 63 for locating the circular annular member 56. From the front end of the shank 67 extend the ignition wires 76, (see Figs. 1, 2 and 11) which converge together so that there will be a small gap between them in front of the burner spray nozzle 61 so that a spark may be generated between them to ignite the oil spray. These wires extend through the openings 68 in the conical flange 48 of the burner section 53.

The ignition members 75 are provided with a cable 77 (see Figs. 1 and 2) which are connected to the junction box 78, the main conduit 79 extending from the junction box 78 to the transformer box 80 to supply the tension necessary for sparking.

The fuel oil is supplied to the burner by the conduit 87 (see Figs. 1 and 2) which conduit 87 is fed by the oil pump 89 through the pressure regulating valve 90. The pressure controlling valve 91 relieves the liquid fuel pressure if it exceeds a predetermined value and permits the pump to circulate. The gauge 92 indicates the pressure of the liquid fuel.

The fuel oil is supplied from a tank (not shown) through a pipe 93, to the filter 94 which is supported by the bracket 95 upon the platform 96 (see Figs. 1, 2 and 3). From the filter the liquid fuel flows through the conduits 97 and 98 to the pump 89. The conduit 99 serves to permit recirculation of the fuel oil upon opening of the pressure limiting valve 91. The pump 89 is driven from the motor 100 and through the shaft 101 having the coupling 102.

Both the motor 100 and the pump 89 are supported upon said platform 96 (see Figs. 1 and 3). The motor is supported by the foot 103 and the bolts 104 while the pump is supported by the bracket member 105. The structure 96 which supports the motor 100, the pump 89 and the filter 84 is supported by the sound and vibration insulating connections 106 upon the structural member 22 connected between the side frames 20.

The motor 100 (see Fig. 1) also drives the fan 107 which is enclosed in the casing 108 and is provided with a central air inlet valve 109 (see also Fig. 2). The casing of the motor is provided with an outlet pipe casting 110 which extends upwardly along the front of the boiler B and closely adjacent to the front of the plate 28. The top of the pipe 110 joins with the depending inlet 111 forming part of the burner construction F. The flange connections 112 and 113 respectively connect the blower casing 108 and the conduit 110, and the depending inlet 111 and the conduit 110. The flange connection 112 is preferably provided with an insulating rubber annulus 114.

The air conduit 110 is of ovular shape and placed adjacent the front flue chamber 30 so that air ascending to the oil burner F will be heated substantially before reaching the oil burner.

As shown in Figs. 1, 2, 4 and 7, the front flue box 30 is provided with a peripheral wall 117 and a back wall 118. The back wall is provided with a plurality of openings receiving the fire tubes 119 in the banks J and 120 in the bank K. The fire tubes 119 provide for flow of hot gases from the rear of the boiler into the upper part of front flue chamber 30, while the tubes 120 provide for flow of hot gases from the lower part of the front flue chamber 30 to the rear of the boiler.

The shape of the front flue chamber 30 is best shown in Figs. 6 and 7, and it will be noted that it is provided with an opening 121 which closely fits around the outside of the combustion box shell 33.

The upper part of the combustion shell, indicated at 122, is not covered by the front flue chamber 30. It will be noted that the side walls 117 of the front flue chamber 30 are closely adjacent to the side walls 25 and the bottom of the boiler shell 24, leaving only a small spacing covered by the border marginal member 27 of the front cover plate 26.

The upper side portions 124 of the flue chamber will receive the gases from the pipe 119, which hot gases will pass downwardly through the flue chamber to the lower portion thereof 125, from where they will flow back to the rear of the boiler (see Figs. 1, 4 and 7).

The rear of the boiler shell 24 is covered by the plate 130 (see Figs. 1, 3, 4 and 5) which has marginal portions 131 extending down along the side faces 25 of the boiler shell 24. The fire box shell 33 extends rearwardly to be substantially flush with the rear cover 130 and has a rearwardly extending lip 132 (see also Fig. 8).

The upper rear flue box 134 has the downwardly diverging bottom walls 133, the curved side walls 135, the ceiling 136 and the rear back wall 138. The rear wall or back plate 138 receives the rear ends of the upper fire tubes 119.

The upper rear flue box 134 receives the hot gases from the combustion chamber E and conducts the hot gases from such combustion chamber E to the upper tube banks J. The hot gases will pass through these banks J on both sides of the boiler to the front flue chamber 30.

The side walls 135 of the upper rear flue box 134 are positioned closely adjacent to the side walls 25 of the main boiler shell 24 (see Figs. 4 and 5). There is a relatively narrow water space between such side walls 135 and the boiler shell 24 which is covered by the downwardly extending marginal portions 131 of the rear cover plate 130.

The ceiling 136 of the flue box 134 contacts with the top of the shell 33 (see particularly Figs. 1 and 8).

The upper rear flue chamber 134 is covered by the water back or section G, as is indicated in Figs. 1, 3 and 4. The water back G takes the shape of the upper rear flue chamber 134, this shape as best shown in Figs. 3, 5 and 8. The water back G includes a casing 140 with flanges 141 which enables its attachment to the angles 142 on the side walls 135 of the upper flue chamber 134. It will be noted that the side walls 135, the lower walls 133 and the ceiling 136 of the rear flue chamber project beyond the cover plate 130 and its marginal edges 131 to receive the water jacket casing 140. The lip 132 of the box shell 33 cooperates and supports the bottom 158 of said water back 140. As indicated in Fig. 3, the lower sides 166 of the water back 140 rests upon the lower wall 133 of the upper flue chamber 134, while the side walls 143 of the water back closely contact with the side wall 135 of said upper flue chamber.

The water back is provided with a hot water coil 144 (see Figs. 1, 3 and 4) having an inlet at 145 and an outlet at 146, which supplies hot water for washing and other domestic purposes. This outlet and inlet portion of the coil 144 is held in the plate 147. The plate 147 is bolted to an opening 148 in the rear of the casing 140 of the water back F, as indicated at 149.

The water back G receives hot water through the connections 150 to the upper portion of the water space H of the boiler (see Figs. 1 and 3) and the lower corner portions 151 of the water back 140 communicate by the connections 152 with the conduits 153, which serve as a return for the water to the boiler B (see particularly Figs. 3 and 6).

The lower rear flue chamber 137 receives excess gases from the lower bank K of the fire tubes 120 and from this flue chamber 137, the hot gases are permitted to pass to the stack or the chimney.

The lower flue chamber 137 (see Figs. 1, 3 and 8) is covered by the flue casing 154, the lower wall 155 of which rests on the rearwardly projecting lip 156 of the boiler shell 24 while its side converging walls 157 and top curved wall 159 contact with the inturned converging edges 158 of said lip 156 and with the lower converging walls 166 and the curved bottom portion 158 of the water back G. The top of the flue chamber 137 is open at 160 and is closed by the lower sides 158 and 166 of the water back casing 140.

The lower rear flue chamber 137 is provided with the back plates 139 receiving the fire tubes 120.

It will be noticed that the fire tubes 119 and 120 are peaned over the openings in the rear plate 118 of the front flue chamber 103 and also over the back plates 138 and 139, of the flue chamber 134 and 137, as best shown in Figs. 1 and 4.

Other connections, of course, may be utilized between the fire tubes 119 and 120 and the plates 138 and 139 to secure suitable liquid and gas tight connections between such tubes and the gas chambers.

The open portion 160 in the lower flue chamber 134 permits better heat exchange contact between the bottom walls 133 of the water back and the hot gases passing through the flue chamber 137. The lower legs 151 of the water back extend beyond the flue chamber casing 154, as indicated at 162 in Fig. 1.

As indicated in Figs. 1 and 3, the outlet connection from the flue chamber 137 is rectangular and is connected to a flue or chimney 164 for drawing off the hot gases after they have passed through said flue chamber.

It will be noted that the lower flue casing 154 forming the flue chamber 137 takes the form of an annular circular section best shown in Figs. 3, 5 and 8, which is complementary to the water back G and fits in the lower part of the rear side of the boiler.

Water is fed to the water space H of the boiler both from the return conduits 153 and from the fresh water inlet 170 which is valved, as indicated at 171 (see Figs. 2, 3 and 6). The lower sides of the boiler shell 24 are provided with openings at 172. The edges of the return conduit casting 173 are provided with a flange connection 175 to the boiler shell 24 (see particularly Fig. 6).

As previously indicated, some of the water passing upwardly through the return conduits 173 will pass through the pipes 152 into the lower legs 151 of the water back G. The return water will then pass up through the water back casing 140 to heat the water passing through the coil 144. The water in the water back G, will be heated due to the heat exchange of its lower walls 158 and 166 with the hot gases in the lower flue chamber 137 and also due to the heat exchange contact of its inside wall 176 (see Fig. 1) with the hot gases in the upper rear flue chamber 134. The water of highest temperature will ascend through the pipes 150 (see particularly Figs. 1 and 3), into the upper portion of the water space H of the boiler.

The water in the boiler shell 24 will be heated from the shell 33 of the combustion box E by the fire tubes 119 and 120, by the heated side and back 117 and 118 of the front flue chambers, the walls 133, 135, 136 and 138 of the upper rear flue chamber 134, and the back wall 139 of the lower rear flue chamber 137. The hot water will ascend to the upper portions of the boiler where it will give off steam to the space I of the boiler.

The hot gases are generated by the burner F in the front end of the combustion chamber E, as indicated in Fig. 1, the nozzle 61 spraying liquid fuel to form a diverging flame.

The burner F is supplied with fuel oil through the conduit 93, the filter 94, the pump 89, the valve 90 and the conduit 87, as shown in Fig. 1. This fuel is forced through the nozzle 54 and is sprayed into the combustion box E as indicated at 177 in Fig. 1.

The motor 100 which drives the oil pump 89 also drives the fan 107 and forces air up through the conduit 110 where it will be heated due to its proximity to the front flue chamber 30. This air will be divided, part flowing through the openings 55 to the inner annular space in the burner and the remainder of the air flowing along the spiral paths 65 between the vanes or fins 57 to whirl through the passage 66, past the lip 37. The inner annular film of air flowing through the passage 64 and the outer whirling stream flowing through the space 66 will assure perfect intermixture between the air and the oil and satisfactory combustion.

The hot combustion gases will flow to the rear of the boiler into the upper rear flue chamber 134, and then will flow forwardly through the fire tubes 119 to the front flue chamber 130. The hot flue gases from the front flue chamber 130 will then flow rearwardly through the fire tube 120 to the rear flue chamber 137 and then to the stack 164.

The steam generated in the space I may be taken off by the outlets 180 and 181 and be supplied to the heating system of the household or building, in the desired manner, the condensed water returning through the returns 153 as previously described.

The blow-off valve 182 will prevent excessive pressure from being generated in the boiler B.

The pipes 183 and 184 are connected, respectively, to the top and bottom of the boiler shell 24, and to a level control 185 (see particularly Figs. 2 and 3). The level control 185 is provided with a sight feed glass 185' and an electrical arrangement 186 connected to a control 190 which cuts off the burner F and causes an alarm if the water level is too low.

The electrical conduits 186 are provided with leads which extend (see Fig. 1) to the main supply 167, which is connected to either 110 volts A. C. or D. C. Since the electrical supply lines must pass through the water level supply it is evident that the motor 100 and the burner F will not be actuated unless the water level is at the proper height.

The burner is also provided with an electrical eye control 187 (see Figs. 1, 3 and 5) which is directed toward the flame 177 and is provided with an electrical control conduit 188 leading to the main control box 190. It will be noted that the motor 100 is also connected by means of the electrical conduit 191 to the main control box 190. If the electrical eye 187 does not register sufficient light and/or heat intensity, due to the fact that the flame 177 has gone out or due to the fact that the interior of the combustion chamber 171 has become full of soot and smoke, it will immediately affect the main control 190 to cut out the motor 100, extinguishing the flame 177 and giving an alarm.

When the trouble has been remedied the operation of the motor will be initiated and the conduit 79 leading to the sparking device 75 will be effective to reignite the flame 177 within the fire combustion chamber 133.

The burner and boiler are also controlled by means of the thermostat connections 192 (see Fig. 1) on the main control box 190, which may be connected to various rooms of the house of building of which the temperature is to be regulated. If the temperature rises to too high a level, the boiler is cut out, while if it drops the burner F is again cut in by cutting off or starting the motor 100.

It is thus evident that the present boiler construction is most efficaciously controlled by the water level through the control 185, by the condition of the flame through the electric eye 187, and by the temperature of the building or rooms, by the thermostat controls 192. If the water level falls too low or if the flame is out and combustion conditions are improper, the controls 185 and 187 respectively, will function to cut off the motor 100, cutting off the supply of air and fuel to the burner F. When this happens a suitable alarm will be given to the householder, advising him the boiler needs attention.

On the other hand the thermostat connection 192 to the control box 190 will effectively shut off and turn on the boiler by controlling the motor 100 to regulate the temperature within the building or house.

It will be noted that the boiler arrangement of the present invention is most compact, with the various conduits both for the hot gases and for the incoming gases arranged for most effective heat exchange, and so as to give a compact heat installation.

The position of the motor 100, the oil pump 89 and the oil filter 84 within the supporting framework of the boiler enhances the compactness and inexpensiveness of the entire installation.

The utilization of the water back G to effect a closure for the rear flue chamber 134 assures a most effective production of a hot water supply for washing and other domestic purposes, apart from the main heat supply for heating purposes. The arrangement of one flue chamber 30 at the front with two flue chambers 134 and 137 at the rear, assures a most effective circulation of the hot gases.

A particular feature of the present invention resides in the arrangement and spacing of the tubes 119 and 120 and the shell 33 so that there may be free circulation of the water vertically horizontally and radially through the space within the shell 24 and between the flue boxes 130, 134 and 137. This entire space is altogether devoid of baffles, inner casings and other flow obstructing devices.

Figure 9:
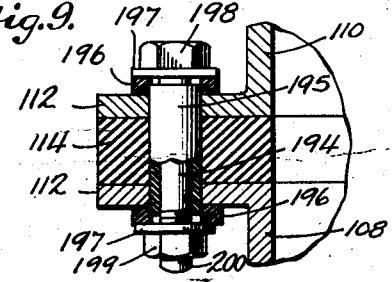
Fig. 9 is a detailed sectional view of the one vibration and sound insulating construction.
Figure 10:
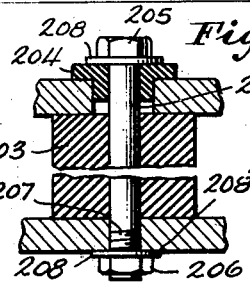
Fig. 10 is a fragmentary sectional view upon an enlarged scale of another construction similar to that of Fig. 9, taken upon the line 10—10 of Fig. 1.

Figs. 9 and 10 show the vibration and noise insulation construction and supports for the boiler to prevent the vibrations from being transmitted to the floor D and to the house or building in which the heating insulation may be installed.

Fig. 9 illustrates in sectional view, the noise insulation construction and the flanges 112 between the casing 108 of the blower 107 and the vertically extending pipe 110 while Fig. 10 illustrates in side sectional view the construction of the connections 106, which support the platform 96 carrying the strainer 84, pump and motor 100, as well as the blower construction 107 upon the structural member 22, which is connected between the side structural frames 20.

In Fig. 9 the flanges 112 are separated by the annular rubber pad 114. The flanges are respectively connected to the upward conduit member 110 and the blower casing 108. The bolt 194 extends entirely through the flanges 112 and the rubber pad 114, is encircled by the rubber annulus 195 and is separated from the flanges 112 by the annular rubber pads 196. The washers 197 contact respectively with the head of the bolt 198 and the nut 199, which is screwed onto the lower threaded end 200 of said bolt.

It will be noted that the casing 108 and the conduit casting 110 are fully insulated from each other by the rubber members 114, 195, 196, so that no sound or vibration will be transmitted through the pipe 110 to the boiler. The bolt 194, although it rigidly connects the flanges 112, nevertheless is devoid of metallic contact with either flange, such metallic contact being prevented by the annular rubber sleeve 195 and the rubber members 196.

Fig. 10 is a similar detailed section upon an enlarged scale, of the connections 106, between the platform 96 and the structural support 22. The bolts 201 extend through openings 202 respectively in the platform 96 and the structural member 22, and are provided with sleeves 203 of a sound and vibration insulating material, such as rubber, which carry the load of the platform 96 on the structural member 22. The openings 202 in the platform 96 and the support 22 are of substantially larger diameter than the bolts 201 to receive the circular annular members 204, which encircle the ends of the bolt 201. The nut 206 is threaded on the lower end 207 of the bolt 201. The washers 208 are pressed against said annuli 204 by the head of the bolt 205 and the nut 206, compressing said annuli against said platform 96 and said support 22.

By utilizing the advantageous boiler construction of the present invention it is possible to cut fuel costs from one-half to two-thirds. The efficiency of the boiler is practically double that of previous boilers. The boiler of the present invention, upon tests, has been found to have an efficiency of 80% as compared to other efficiencies of 40% to 50%, and has a loss up to stack of only 20%, as compared to previous losses of 50%. Moreover, the construction of the boiler is such that the radiation into the room in which the boiler is placed that other losses are also reduced to a minimum.

A particular feature of the present invention resides in the fact that the water is permitted to circulate freely vertically, horizontally and radially through the boiler between the front flue chamber 30 and the rear flue chambers 134 and 137 along the combustion chamber shell 33 and the tube banks J and K. The fire tubes 119 and 120 are so spaced from each other and from the shell 30 as to permit free water circulation. By placing the combustion chamber E and the banks of fire tubes J carrying gases of hottest temperature closely adjacent the water surface in the upper portion of the boiler shell 24, assurance is had of efficient heat exchange and of most economic utilization of the gases. On the other hand, the fire tubes 120 in the lowest bank K will contain the gases of the lowest temperature and will accordingly be contacted with the relatively cold water passing through the lower portion of the boiler shell, through the rear conduits 153.

The refractory lining 34 in the combustion chamber shell 33 prevents excessive transfer of heat from the gases when they pass through the fire tubes 119 and 120 and also prevents too rapid cooling within the combustion chamber E which might prevent complete combustion. By permitting the refractory lining 34 to build up to a relatively high temperature assurance is had of complete combustion, cracking and deposit of carbon deposits being substantially eliminated. In operation, the front portion of the lining 35 is heated to a white or bright red temperature, while the color of a chamber 34 gradually changes to a deeper and deeper red as it approaches the flue box 134.

In one instance, it was found that the temperature in the middle of the combustion chamber E would be about 2800° F. In the upper rear flue box it would be about 1400° F. and in the front flue box it would be about 600 to 700° F., while the gases passing through the rear lower flue chamber and into the stack would have a temperature of about 355° F. as compared to other boilers in which the stack temperature varies between 500 and 1000° F. Although not shown, the oil passing through the conduit 80 might also be preheated as by passing through a water back G or by some other suitable arrangement to assure a more suitable combustion.

An important feature of the present invention resides in the fact that a forced draft is produced by the fan 107 which combines with the normal draft from the stack 164 to assure most efficient passage of the hot gases through the combustion chamber E and through the fire tubes 119 and 120.

This is much more satisfactory than an induced draft in which case the stack pressure is often positive and above atmospheric, since in the present instance advantage is taken of the normal negative pressure existing in the stack to assure more efficient safer operation. Induced draft operation is frequently objectionable because it will continue without flue connection with exhaust to the chimney or stack.

Although the sizes and dimensions may be widely varied in one commercial installation the following sizes were found to be quite satisfactory. In this commercial installation the diameter of the combustion shell was about 12", the average width of the boiler shell 24 between the walls 25 was about 26", while the height of the shell 24 was 30". The overall height of the boiler including the support A was about 48", while the overall width including the casing C was about 32". Preferably the boiler was entirely covered by a proper casing of rock wall insulation.

The heating area of the shell 33 and the tubes 119 and 120 and of the flue boxes 30, 134 and 137 are also preferably so regulated that they will supply sufficient heating for about 800 to 1000 square feet of radiating surface within the boiler for a ten room house, 76 square feet of heating surface in the boiler being equivalent to about 800 to 1000 square feet of radiating surface. In the installation referred to a copper bearing boiler plate or flanged steel was utilized for the boiler 24 and for the combustion chamber 33, this plate being preferably about ¼" in thickness. The flue boxes 30, 134 and 137 were provided with walls of the same material of about $\frac{3}{16}$" in thickness. The fire tubes 119 and 120 were of 1½" tubing, the tubes 119 being about 18" long and the tubes 120 being about 23¼" long. These tubes were made of boiler tube steel, as for example charcoal iron tubes.

The tubes were preferably spaced so that their exterior walls will not be closer together than ½". The fire brick lining 34 was most satisfactorily regulated to be about ⅝" in thickness.

In this installation the motor 100 was of ⅙ horse power and the pump 89 was capable of pumping twenty gallons per hour at a pressure of between 100 to 150 pounds.

The blower 107 preferably has a capacity of 150 cubic feet of air per minute.

The length of the boiler E may vary from 27" up, a 25" length giving about 7 to 8 boiler horse power. In the installation referred to above a boiler length of 27" was utilized with a flue chamber front depth and rear depth of 4½". The coil 144 in this installation was designed to produce about 150 gallons in three hours with a 100° F. temperature rise. In this installation the boiler held about 32 gallons of water while the water back held about 12 gallons of water.

As indicated particularly in Fig. 1, a space of about 18" in height under the boiler including the various operating mechanism such as the fan 107, the motor 100 and the pump 89, which operating mechanism being provided with the sound and vibration insulating supports shown in Figs. 9 and 10, was provided for preventing transmission of any noise or vibration to the building or house in which the installation was placed.

The transformer supplying a sparking device 75 preferably steps up the voltage of 110 A. C. or D. C. to 12000 volts, enabling the intermittent spark element to ignite the flame initially, or a continuous spark throughout operation.

Preferably the boiler is so regulated as to produce a maximum steam pressure of about 4 pounds, and it is so controlled that the steam will never be less than 1 pound while the boiler is in use. Suitable thermostatic devices, not shown, may also be employed to control the water temperature in the boiler so that it will never drop below 160° F. To assure most efficient operation, the burner F will either be burning at full rate or will be altogether shut down, since efficient operation is not obtained if the flue tubes 119 and 120 are not substantially completely filled with the hot flue gases passing therethrough at the predetermined rate of flow.

What is claimed is:

1. A heating installation for supplying hot water and steam to a radiator system in the building and for simultaneously supplying hot water for washing and other domestic purposes including a fire tube boiler provided with a main horizontal drum, the upper portion of which serves as a steam space the remainder portion serving as a water space, having a central transverse cylindrical subsidiary drum serving as a combustion chamber extending longitudinally therethrough with its top below the steam space, an upper rear flue chamber extending inside of said main drum receiving the hot gases from said combustion chamber, a front flue chamber extending inside of said main drum, a plurality of front pass horizontal fire tubes connecting said upper rear flue chamber and said front flue chamber, an additional lower rear flue chamber extending rearwardly outside of said main drum, a plurality of rear pass fire tubes connecting said front flue chamber with said lower rear flue chamber below said combustion chamber, and a water leg of the same contour as said upper rear flue chamber and of the same depth as said lower rear flue chamber and serving to close the rear of the upper chamber and the top of the lower chamber.

2. The installation of claim 1 in which the water leg is positioned directly over the open rear end of the combustion chamber, so that it will be heated by direct radiation from said combustion chamber and by the highly heated gases just as they leave said combustion chamber, said water leg being in communication with the upper and lower portions of the water spaced boiler.

3. In a boiler construction for domestic heating installations, a main cylindrical horizontal drum with flattened vertical sides, the upper portion of which serves as a steam space and the lower portion of which receives the water to be heated, a subsidiary cylindrical drum serving as a combustion chamber extending through said boiler closely adjacent to the steam space and with its top portion slightly below the water level, said subsidiary drum being provided with an oil burner at the front end of the construction and an upper rear flue chamber at the rear end of the construction to receive the hot gases therefrom, said upper rear flue chamber terminating at the rear end of the main drum, extending longitudinally inside of the rear end of the main drum, with its back plate receiving the ends of said lateral banks of tubes, and extending laterally from side to side of the main drum and vertically from the top to the bottom of the subsidiary drum and from side to side of and terminating slightly inside of the sides of the main drum, upper lateral banks of horizontal tubes confined to the sides of the subsidiary drum and below the water level and positioned below the top of the subsidiary drum so that the uppermost tubes of said banks are substantially below the top of the subsidiary drum, for conducting said hot flue gases forwardly through the body of the water, a front flue chamber at the front of the main drum receiving the gases from said upper banks of tubes, said front flue chamber extending longitudinally inside of the front end of the main drum its back plate receiving said tubes and being substantially to the rear of the front end of said drum, extending vertically from the top of the subsidiary drum to slightly inside the bottom of the main drum, and extending laterally from side to side of the main drum, but terminating slightly inside of the main drum, a lower bank of horizontal tubes connected with said front flue chamber and extending rearwardly of the boiler along the bottom of said subsidiary cylinder below said upper banks, a lower rear flue chamber receiving the gases from said lower bank, said lower rear flue chamber extending rearwardly from the rear end of the main drum and vertically from the bottom of the subsidiary drum to the bottom of the main drum, a water chamber communicating with the water space of the main drum extending laterally and vertically to conform to and close the upper rear flue chamber and extending rearwardly to substantially the same length as, and closing the top of, the lower rear flue chamber, said water chamber receiving a hot water coil for domestic hot water supply, and a stack connected to said lower rear chamber.

EDGAR T. AVERY.